(12) United States Patent
Emde et al.

(10) Patent No.: US 7,673,217 B2
(45) Date of Patent: Mar. 2, 2010

(54) METHOD OF DETECTING DATA TRANSMISSION ERRORS IN A CAN CONTROLLER, AND A CAN CONTROLLER FOR CARRYING OUT THE METHOD

(75) Inventors: Christoph Emde, Leingarten (DE); Johannes Hesselbarth, Moeglingen (DE); Alexander Springer, Gemmrigheim (DE)

(73) Assignee: Robert Bosch GmbH, Stuttgart (DE)

( * ) Notice: Subject to any disclaimer, the term of this patent is extended or adjusted under 35 U.S.C. 154(b) by 96 days.

(21) Appl. No.: 10/274,901

(22) Filed: Oct. 21, 2002

(65) Prior Publication Data

US 2003/0115543 A1 Jun. 19, 2003

(30) Foreign Application Priority Data

Oct. 20, 2001 (DE) ............................ 101 52 235

(51) Int. Cl.
*G11C 29/00* (2006.01)
*H03M 13/00* (2006.01)

(52) U.S. Cl. .................. 714/763; 714/758; 714/800; 714/807

(58) Field of Classification Search .............. 714/758, 714/763, 800, 807
See application file for complete search history.

(56) References Cited

U.S. PATENT DOCUMENTS

| 4,317,201 | A | * | 2/1982 | Sedalis .................. 714/766 |
| 4,682,328 | A | * | 7/1987 | Ramsay et al. ............. 714/15 |
| 4,720,784 | A | * | 1/1988 | Radhakrishnan et al. .... 710/107 |
| 5,323,385 | A | * | 6/1994 | Jurewicz et al. ........... 370/300 |
| 5,459,850 | A | * | 10/1995 | Clay et al. .............. 711/171 |
| 5,784,391 | A | * | 7/1998 | Konigsburg .............. 714/773 |
| 6,385,210 | B1 | * | 5/2002 | Overberg et al. .......... 370/447 |

* cited by examiner

*Primary Examiner*—Joseph D Torres
(74) *Attorney, Agent, or Firm*—Kenyon & Kenyon LLP

(57) ABSTRACT

A method of detecting data transmission errors in a CAN controller includes generating at least one check bit that is verifiable for ensuring the consistency of the transmitted data. A CAN controller that ensures continuous error monitoring during data transmission includes an interface unit for exchanging data with a CAN bus, a memory unit for storing received data and data to be transmitted, and an electronic unit for controlling data transmission between the memory unit and the interface unit. The interface unit of the CAN controller has an arrangement for generating check bits for received data and for verifying check bits for data to be transmitted.

12 Claims, 3 Drawing Sheets

METHOD OF DETECTING DATA TRANSMISSION ERRORS IN A CAN CONTROLLER, AND A CAN CONTROLLER FOR CARRYING OUT THE METHOD

FIELD OF THE INVENTION

The present invention relates to a method of detecting data transmission errors in a CAN controller, and a CAN controller for carrying out the method.

BACKGROUND INFORMATION

There has been a trend toward the use of control and regulating systems in motor vehicles including engine and transmission controllers, anti-lock systems (ALS), anti-slip control systems (ALC), and multi-functional vehicle dynamics control systems. Powerful bus systems may be needed to exchange data in real time between these components. A bus system referred to as the Controller Area Network (CAN) was developed for optimum handling of these functions. CAN is also used in industrial applications beyond the field of automotive engineering.

The CAN bus is a serial bus to which the individual stations, for example, control units, are connected via CAN controllers. The individual stations are able to communicate with other stations over the bus by sending and receiving messages.

Much of the data transmitted in motor vehicles may be related to safety. The data may be used to control the on-board safety systems, for example, the brake system. In the case of safety systems, it is important to prevent the occurrence of situations that could jeopardize safety in the event of a malfunction. It must therefore be ensured that safety-related data does not become corrupted during transmission, or that corrupted data is detected.

Each time a message is transmitted, it is possible—albeit not very probable—for one bit within the message to change value, for example a "1" switching to a "0". It is even possible for multiple bits within the same message to "flip over."

The main causes of such disturbances may be external electromagnetic fields that may be unavoidable in technological systems.

Because it may not be possible to prevent errors, i.e., a bit "flipping over," it may be desirable to reliably detect the error. This may be done by the sender inserting redundant check bits into the message. The receiver can then use the check bits to determine whether the transmission was error-free or faulty.

The CAN controllers may support very reliable data transmissions. The data is provided with CRC check bits during transmission. These bits are verified on receipt. This may make it possible to detect faulty transmissions and respond to them accordingly. For example, data that was not properly received the first time around may be requested again.

The actual interface between a CAN controller and a CAN bus is the CAN protocol kernel. It is used to transmit data to the bus and receive data from the bus. During transmission, the CAN protocol kernel generates the check bits and sends them together with the corresponding data. On receipt of a message, the CAN protocol kernel checks the received check bits and thus determines whether the data was transmitted without errors.

The CAN-based CRC check bits monitor only especially error-prone transmissions between the controllers. However, transmission errors cannot be ruled out even during transmissions within the CAN controller and during transmissions between the CAN controller and a microprocessor, for example, the central processing unit (CPU). This may be a weakness in the ability of conventional CAN controllers to monitor data transmission errors.

To secure internal data transmissions, conventional systems may use, for example, a "loop-back mode." The CAN bus output and the input of the CAN protocol kernel may be interconnected, while the CPU may transmit defined data and receive it again directly. A comparison of the transmitted and received data may enable the entire internal transmission link to be checked.

The disadvantage of this method may be that the control unit may need to be disconnected from the bus during checking to avoid making the check data visible on the bus. In many systems, temporary disconnection of a station is unacceptable, which means that a loop-back test may be carried out only once at activation.

The method described above thus may not support continuous monitoring of the entire transmission path. However, this may be necessary for safety-critical systems.

SUMMARY OF THE INVENTION

An exemplary method according to the present invention of detecting data transmission errors in a CAN controller, in particular when transmitting data between a microprocessor and an interface unit, provides that at least one check bit may be generated that is verifiable for ensuring the consistency of the transmitted data.

For receiving data, the exemplary method may include the following steps: the data located on the CAN bus is first received by the interface unit. This interface unit then determines and generates at least one check bit for the received data. The data is stored along with the at least one check bit in a memory unit. The data and the at least one check bit are subsequently input by the microprocessor. The latter may subsequently verify whether an error occurred during data transmission.

The exemplary method may be deactivatable for the effective transmission of non-critical data. The microprocessor then determines whether or not the received data is safety-related. Depending on this determination, the microprocessor either does or does not verify the at least one check bit.

Data transmission in the CAN controller may advantageously take place via a bus interface. The bus interface logic is used to transmit the data, which is then converted in the bus interface according to the requirements of the individual components.

The error detection function is more effective if more redundant check bits are transmitted for verification. One implementation may involve inserting as many check bits in a message as necessary for the receiver to detect and thus also correct the faulty bits in the message. However, transmission efficiency declines as the number of check bits increases. No new data bits are transmittable as long as check bits are being sent over the line. A compromise may therefore be made between safety and transmission efficiency.

The parity bit offers a simple form of data security. A supplementary bit, known as the parity bit, is added to the data bits to produce an even number of ones within the bits, i.e., data bits plus the parity bit. If a bit "flips over" along the transmission path, there is no longer an even number of ones within the data bits plus parity bit. The receiver therefore determines that an error has occurred. However, if two or another even number of bits change values simultaneously, the parity bit may no longer be usable to determine this error.

The detection of a checksum is another method of ensuring data security.

The cyclic redundancy check (CRC) may be a very efficient data security method. The CAN bus uses this method to transmit data between the stations connected to the CAN bus.

The exemplary method involves the following steps for transmitting data: the microprocessor first determines and generates at least one check bit for the data to be transmitted, which has been provided by the microprocessor. The check bit is then stored in the memory unit along with the data to be transmitted. The data and the check bits are output by the interface unit. The latter may then verify, on the basis of the check bits, whether a data transmission error has occurred. If not, the data is transferred to the CAN bus.

During transmission, the microprocessor may decide whether the transmission is safety-related and detect the check bits or, without any additional computing power, generate check bits that signal to the interface unit that there may be no need to verify the data transmission.

The CAN controller according to an exemplary embodiment of the present invention includes an interface unit for exchanging data with a CAN bus, a memory unit for storing received data and data to be transmitted, and an electronic unit for controlling the data transmission between the memory unit and the interface unit. The interface unit may include an arrangement for generating at least one check bit for received data and for verifying at least one check bit for data to be transmitted.

To detect data transmission errors in the CAN controller during data transmission, at least one additional internal check bit may be introduced. The one or more check bits are stored along with the data in the memory unit. When the data is received, the check bits are generated in the interface unit and may then be verified by a microprocessor that inputs the data from the memory unit. When the data is transmitted, the at least one check bit is generated in the microprocessor and may then be verified by the interface unit before passing the data on to the CAN bus.

The arrangement for generating and verifying the at least one check bit in the interface unit may be hardware-implemented or provided as a computer program. The computer program includes a program code arrangement for generating and verifying at least one check bit.

A computer program product according to an exemplary embodiment of the present invention includes an arrangement for generating and verifying at least one check bit. The arrangement, i.e., the program code arrangement, may be stored on a machine-readable data medium. In particular, EEPROMs and flash memories as well as CD-ROMs, floppy disks or hard disk drives may be used as suitable data media.

The memory unit in the CAN controller may be a RAM chip in which a certain memory area is provided for each possible item of data. This may considerably simplify communication between the individual components.

The electronic unit in the CAN controller, which may be used to control data transmission, may advantageously be a state machine. State machines are easy to design and implement using conventional development tools.

It may be advantageous to provide the CAN controller with a bus interface whose internal logic is used to transmit data between the individual components, namely the interface unit, memory unit, electronic unit, and microprocessor.

The control unit according to an exemplary embodiment of the present invention may include the above-mentioned CAN controller, a microprocessor, and a memory device. The microprocessor may have an arrangement for generating and verifying at least one check bit.

After data is received, at least one check bit may be generated in the interface unit in the CAN controller. The data is stored in the memory unit along with the one or more check bits. The microprocessor outputs the data and the at least one check bit and is able to verify the at least one check bit. On the basis of the one or more check bits, the microprocessor may determine whether an error has occurred during data transmission in the CAN controller.

When data is transmitted, the microprocessor may determine and generate at least one check bit and subsequently store it in the memory unit along with the data. The interface unit, which outputs the data to be transmitted from the interface unit, may be able to verify the at least one check bit and thus determine whether an error occurred during data transmission. Errors may be detected in this manner during data transmission between the microprocessor and memory unit or between the memory unit and interface unit.

The CAN controller in the control unit may be connected as a separate chip to the microprocessor. However, the microprocessor and CAN controller may be integrated into one chip. A plurality of microprocessors or microcontrollers having integrated CAN interfaces or CAN controllers are currently available. In this case, the CAN controller may be "on-board."

DETAILED DESCRIPTION

Figure 1:
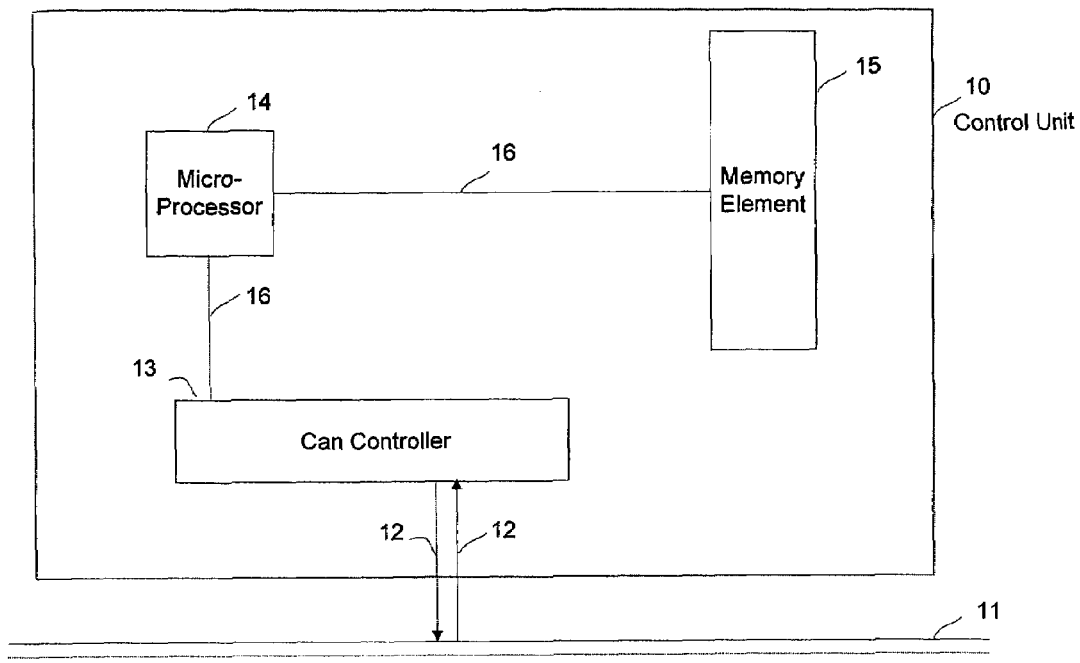
FIG. 1 shows a schematic representation of an exemplary embodiment of the control unit according to the present invention.

In FIG. 1, reference number 10 designates the control unit as a whole. Control unit 10 is connected to a CAN bus 11. Arrows 12 indicate that bi-directional communication is possible between control unit 10 and CAN bus 11.

The control unit has a CAN controller 13, a microprocessor 14, and a memory element 15, in this case a RAM chip. The components of control unit 10 are interconnected by a data line 16. CAN controller 13 acts as an interface to CAN bus 11. Data is transmitted to and received from CAN bus 11 via this interface.

CAN controller 13 first inputs the data transmitted via CAN bus 11. Check bits are subsequently generated in CAN controller 13 for the received data. Microprocessor 14 inputs the data along with the check bits. This may make it possible to determine whether an error occurred during data transmission from CAN controller 13 to microprocessor 14.

Figure 2:
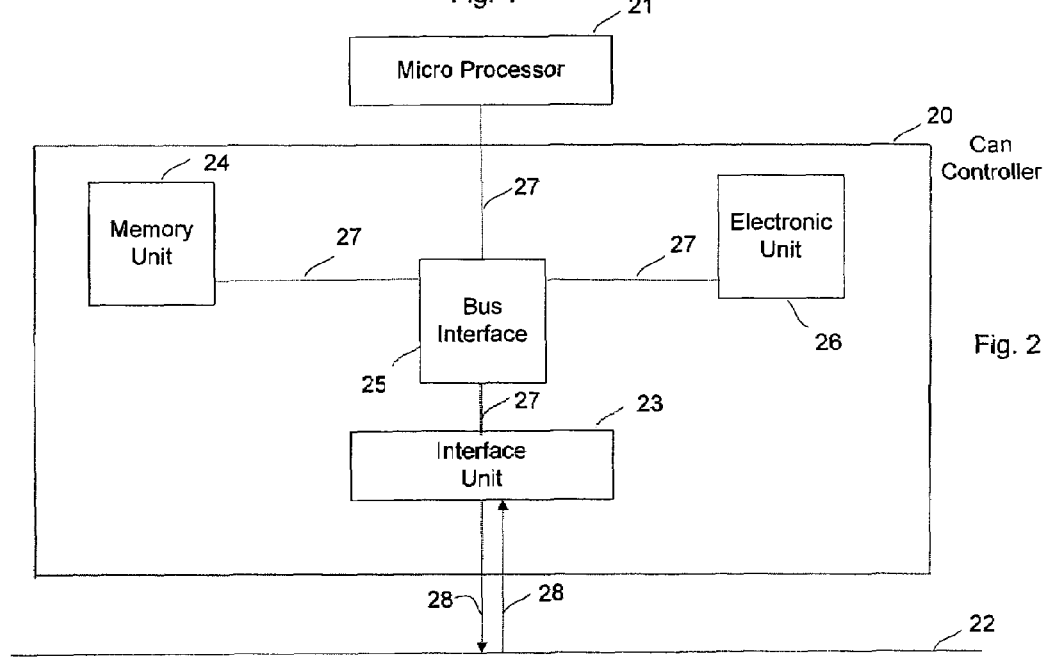
FIG. 2 shows a schematic representation of an exemplary embodiment of the CAN controller according to the present invention.

FIG. 2 shows a schematic representation of a preferred embodiment of the CAN controller according to an exemplary embodiment of the present invention. Reference number 20 designates the CAN controller as a whole. The Figure also shows a microprocessor 21 and a CAN bus 22. CAN controller 20 has an interface unit 23, a memory unit 24, a bus interface 25, and an electronic unit 26.

Interface unit 23, in this case a CAN protocol kernel, represents the actual interface to CAN bus 22. It transmits data to CAN bus 22 and receives data from CAN bus 22. Communication within the CAN controller and between CAN controller 20 and microprocessor 21 takes place via data lines 27. The bi-directional link between interface unit 23 and CAN bus 22 is indicated by arrows 28.

The received data and the data to be transmitted are stored in memory unit 24, which may be a RAM mailbox. The individual components of CAN controller 20 are connected by the logic in bus interface 25.

Data transmission between interface unit 23 and memory unit 24 is controlled by electronic unit 26, which may be a state machine. Microprocessor 21 retrieves received data from memory unit 24, where it also stores data to be transmitted.

Because the data, i.e., messages, being transmitted and received may be known, an area for each message may be provided in memory unit 24.

Figure 3:
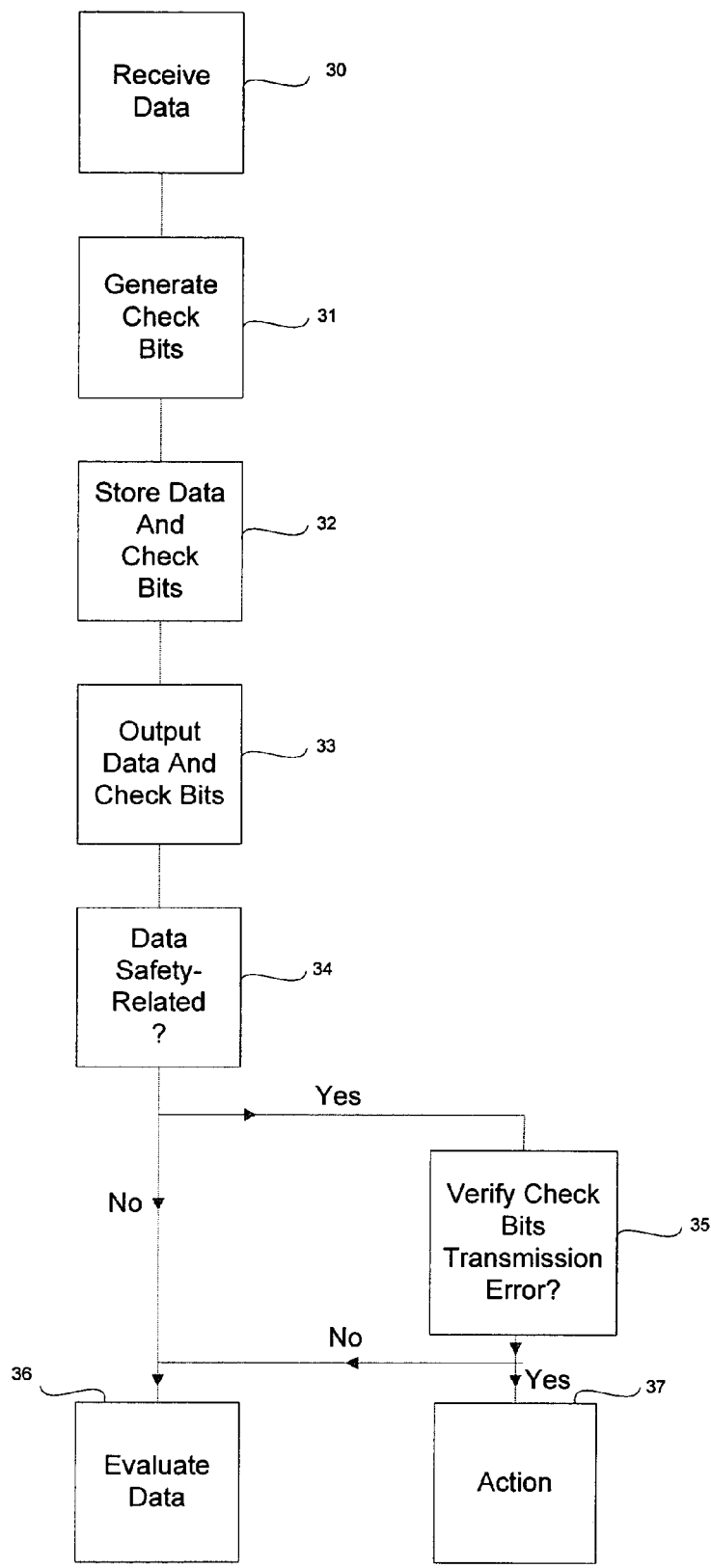
FIG. 3 shows an exemplary method according to the present invention in the form of a flow chart for processing data received via a CAN bus.

FIG. 3 shows an exemplary method according to the present invention in the form of a flow chart for processing data received via a CAN bus.

In a first step 30, data is received by interface unit 23. The received data represents, for example, a control command.

In a subsequent step 31, corresponding check bits are generated by interface unit 23. In a step 32, the data is stored in memory unit 24 along with the corresponding check bits. The data and corresponding check bits are output by microprocessor 21 in a step 33. Microprocessor 21 decides whether or not the data is safety-related. This takes place in a step 34. If the data is safety-related, the check bits are verified in a further process step 35. If no safety-related data is present, it may be further evaluated without verification in a step 36. The control command, for example, may then be executed.

If the verification in step 35 reveals that no transmission errors have occurred, the data is evaluated in step 36. If an error is detected, appropriate action is initiated in a step 37. If necessary, the data may then be requested again.

Figure 4:
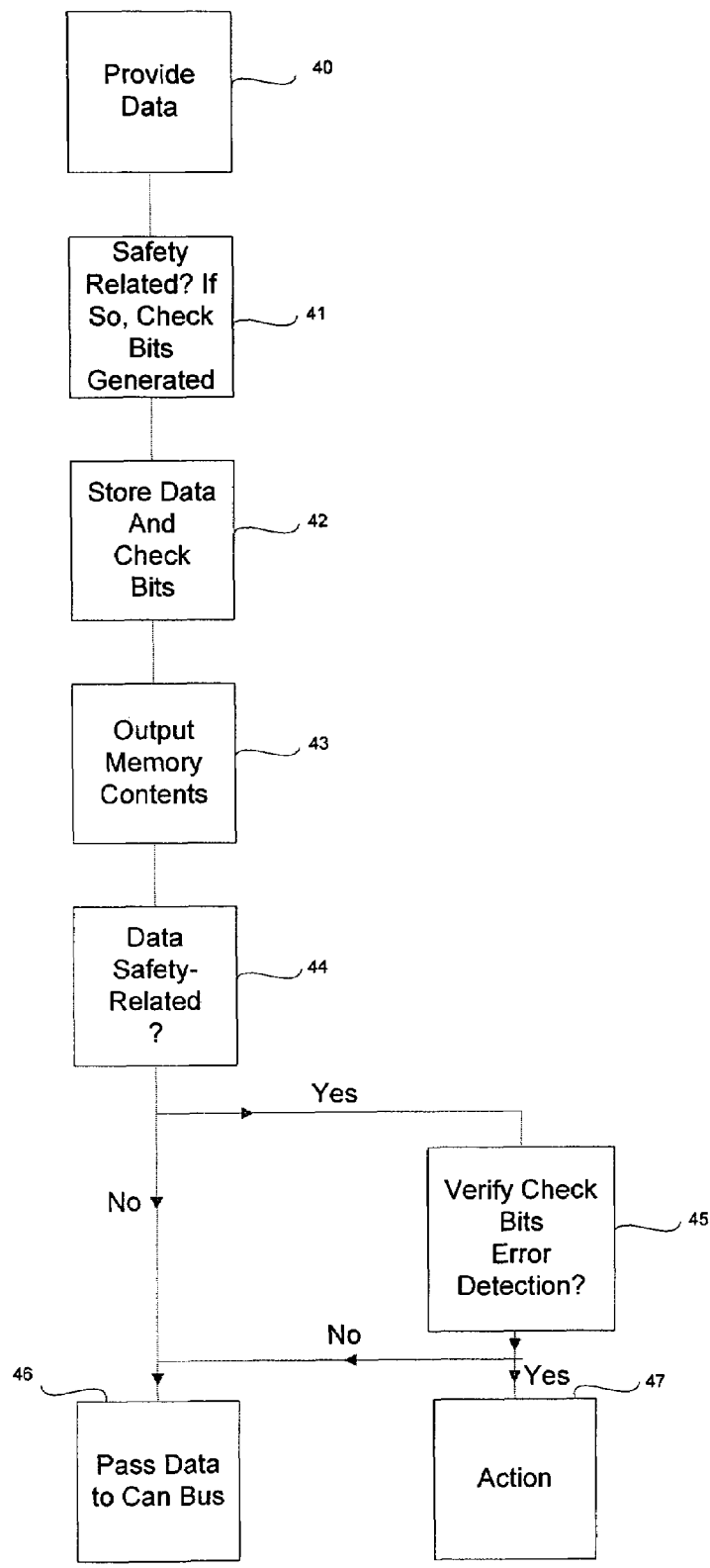
FIG. 4 shows an exemplary method according to the present invention in the form of a flow chart for processing data to be transmitted via a CAN bus.

FIG. 4 shows an exemplary method in the form of a flow chart for processing data to be transmitted via a CAN bus.

In a first step 40, data to be transmitted is provided by microprocessor 21. This data represents, for example, a reply following a completed action or the control unit status.

In a subsequent step 41, microprocessor 21 decides whether or not the data is safety-related. Check bits are then generated accordingly.

In a step 42, the data is subsequently stored along with the check bits in memory unit 24. The memory contents are output by interface unit 23 in a step 43. In a subsequent step 44, interface unit 23 determines whether or not the data is safety-related, based on the check bits. If the data is safety-related, the check bits are verified in a step 45. If the data is not safety-related, it is passed on to CAN bus 22 without further verification in a step 46. If an error is detected during check bit verification in step 45, appropriate action is taken in a step 47. Otherwise, the data is transferred to CAN bus 22 in step 46.

An exemplary method according to the present invention may be used to compensate for the weakness in the error monitoring function of known methods. At least one additional check bit may be introduced to detect errors during data transmission within CAN controller 22. The check bits may be stored along with the data in memory unit 26. When data is received via CAN bus 22, the check bits may be generated by interface unit 23 and verified by microprocessor 21. When data is transmitted, the check bits may be generated by microprocessor 21 and verified by interface unit 23.

To monitor especially error-prone transmissions between CAN controllers 22 that are connected to CAN bus 22, additional available methods may continue to be used. Thus, interface unit 23 may typically verify the data associated with check bits and generate check bits when transmitting data. Errors may be detected in this manner during data transmission via the CAN bus.

An exemplary method according to the present invention may also be used for continuous monitoring of data transmissions from one microprocessor to another. This may make it possible to further increase the safety of a system. The improvement may be demonstrated on the basis of an FMEA analysis.

An FMEA analysis is a procedural model for developing systems. This analysis allows the considering of possible errors as early as at the system development stage. The analysis thus may be used to develop systems that are less susceptible to errors. Systems may be evaluated to determine their error susceptibility.

The check bits used on CAN bus 22 are not used for internal data transmissions, since this may require transmission frame values in addition to the actual data. However, transferring the data frame to microprocessor 21 would be more complicated than recalculating the check bits.

Another advantage may be that the exemplary method is deactivatable for the effective transmission of non-critical data. For example, a simple implementation would look like the following, if the check bits are calculated in the form of a checksum. The checksum calculation and verification in interface-unit 23 is hardware-implemented. Checksums that are equal to zero are ignored by the hardware.

When transmitting data, microprocessor 21 may determine whether the transmission is safety-related and generates the check bits accordingly. If no safety-related data is present, the microprocessor may generate a zero checksum without any additional computing power. Checksums that are equal to zero may then be ignored by interface unit 23.

When data is received, microprocessor 21 may determine whether the checksum determined by the hardware in interface unit 23 should be evaluated.

An exemplary method according to the present invention may thus allow the entire transmission path to be monitored continuously.

What is claimed is:

1. A computer-implemented method of detecting at least one data transmission error in a CAN controller, the method comprising:
   generating at least one check bit;
   transmitting the at least one check bit only internally within a control unit, wherein the control unit includes the CAN controller and a microprocessor, the at least one check bit being transmitted between the CAN controller and the microprocessor without generating an additional load on any bus that is external to the CAN controller and the microprocessor; and
   verifying the at least one check bit to ensure a consistency of data transmitted between an interface unit of the CAN controller and the microprocessor, and to detect the at least one data transmission error therebetween.

2. The method of claim 1, further comprising:
   receiving data located on a CAN bus by the interface unit before the generating;
   storing the received data along with the at least one check bit in a memory unit after the generating; and
   inputting the received data and the at least one check bit by the microprocessor after the generating;
   wherein, after the inputting operation, the at least one check bit is verifiable by the microprocessor.

3. The method of claim 2, further comprising: determining by the microprocessor whether the received data is relevant to safety.

4. The method of claim 3, further comprising: verifying by the microprocessor the at least one check bit.

5. The method of claim 3, wherein the microprocessor does not verify the at least one check bit.

6. The method of claim 1, further comprising:
  providing data to be transmitted via a CAN bus by the interface unit before the generating;
  storing the received data along with the at least one check bit in a memory unit after the generating; and
  reading out the provided data and the at least one check bit by the interface unit after the generating;
  wherein the at least one check bit is generated for the provided data, and the interface unit is operable to verify finally the at least one check bit.

7. The method of claim 6, wherein the at least one check bit indicates whether safety-relevant data is present.

8. The method of claim 7, further comprising: verifying by the interface unit the at least one check bit.

9. The method of claim 7, wherein the interface unit does not verify the at least one check bit.

10. The method of claim 1, wherein the method is performed when transmitting data between the microprocessor and the interface unit.

11. A computer-readable storage medium encoded with a computer program executable on one of a computer and a corresponding processing unit, the computer program having a program code to perform the following:
  generating at least one check bit;
  transmitting the at least one check bit only internally within a control unit, wherein the control unit includes a CAN controller and a microprocessor, the at least one check bit being transmitted between the CAN controller and the microprocessor without generating an additional load on any bus that is external to the CAN controller and the microprocessor; and
  verifying the at least one check bit to ensure a consistency of data transmitted between an interface unit of the CAN controller and the microprocessor, and to detect the at least one data transmission error therebetween.

12. The storage medium of claim 11, wherein the corresponding processing unit includes one of the interface unit and the microprocessor.

\* \* \* \* \*